(12) United States Patent
Wallgren et al.

(10) Patent No.: US 7,587,336 B1
(45) Date of Patent: Sep. 8, 2009

(54) ITERATIVE CONSTRAINT COLLECTION SCHEME FOR PREPARATION OF CUSTOM MANUFACTURING CONTRACTS

(75) Inventors: Anders R. Wallgren, San Jose, CA (US); Pravin S. Kothari, San Jose, CA (US); Elizabeth A. Cleary, San Francisco, CA (US); Philip C. Nelson, San Jose, CA (US); Brett E. Battles, Menlo Park, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 715 days.

(21) Appl. No.: 09/328,983

(22) Filed: Jun. 9, 1999

(51) Int. Cl.
*G06Q 30/00* (2006.01)

(52) U.S. Cl. .................. 705/26; 705/1; 705/27; 705/37; 705/80; 235/381; 703/1; 703/6; 715/506; 345/733; 358/1.15; 709/107; 709/202; 709/203; 709/219

(58) Field of Classification Search .................. 705/80, 705/26, 1, 37, 27; 235/381; 703/1, 6; 715/506; 345/733; 709/107, 202, 203, 219; 358/1.15
See application file for complete search history.

(56) References Cited

U.S. PATENT DOCUMENTS

| | | | |
|---|---|---|---|
| 3,581,072 A | 5/1971 | Nymeyer | |
| 3,703,006 A | 11/1972 | Sharma | |
| 3,703,725 A | 11/1972 | Gomersall et al. | |
| T918,004 I4 | 1/1974 | Chappell et al. | |
| 3,905,045 A | 9/1975 | Nickel | |
| 3,930,251 A | 12/1975 | Salava et al. | |
| 3,988,570 A | 10/1976 | Murphy et al. | |
| 4,007,362 A | 2/1977 | Sindermann | |
| 4,017,831 A | 4/1977 | Tieden et al. | |
| 4,231,096 A | 10/1980 | Hansen et al. | |
| 4,400,783 A | 8/1983 | Locke, Jr. et al. | |
| 4,433,426 A | 2/1984 | Forster | |
| 4,449,186 A | 5/1984 | Kelly et al. | |
| 4,468,750 A | 8/1984 | Chamoff et al. | |

(Continued)

FOREIGN PATENT DOCUMENTS

EP     0 517 953 A2     12/1992

(Continued)

OTHER PUBLICATIONS

Anonymous, "Buying a car on-line", Successful Meetings; Philadelphia; Oct. 1998 extracted from Internet on Apr. 4, 2002 from web site: http://www.proquest.umi.com/pqdweb?TS.*

(Continued)

*Primary Examiner*—Yogesh C Garg
(74) *Attorney, Agent, or Firm*—Michael A. Glenn; Glenn Patent Group

(57) ABSTRACT

A series of iterative customer submissions and vendor responses are used to collect sufficient information concerning a custom manufacturing project so as to produce a sufficiently constrained job request as to allow at least one of the vendors to submit a quote for the project. The submissions and responses are preferably made through Web forms and, in one example, the custom manufacturing project is a print job. The collection process is preferably computer assisted so as to incrementally add constraints to an initially under-constrained job request to produce the sufficiently constrained job request.

16 Claims, 4 Drawing Sheets

U.S. PATENT DOCUMENTS

| | | | |
|---|---|---|---|
| 4,475,156 A | | 10/1984 | Federico et al. |
| 4,484,522 A | | 11/1984 | Simeth |
| 4,495,582 A | | 1/1985 | Dessert et al. |
| 4,578,768 A | | 3/1986 | Racine |
| 4,584,648 A | | 4/1986 | Dlugos |
| 4,601,003 A | | 7/1986 | Yoneyama et al. |
| 4,796,194 A | | 1/1989 | Atherton |
| 4,839,829 A | | 6/1989 | Freedman |
| 5,229,948 A | | 7/1993 | Wei et al. |
| 5,291,397 A | | 3/1994 | Powell |
| 5,321,841 A | * | 6/1994 | East et al. .................... 709/107 |
| 5,432,887 A | | 7/1995 | Khaw |
| 5,463,555 A | | 10/1995 | Ward et al. |
| 5,758,328 A | * | 5/1998 | Giovannoli .................. 705/26 |
| 5,794,207 A | | 8/1998 | Walker et al. |
| 5,809,144 A | * | 9/1998 | Sirbu et al. .................. 380/282 |
| 5,826,244 A | * | 10/1998 | Huberman .................. 705/37 |
| 5,835,712 A | * | 11/1998 | DuFresne .................. 709/203 |
| 5,838,906 A | * | 11/1998 | Doyle et al. ................ 709/202 |
| 5,844,553 A | * | 12/1998 | Hao et al. .................. 345/733 |
| 5,930,810 A | | 7/1999 | Farros et al. ................ 235/381 |
| 5,970,471 A | * | 10/1999 | Hill .............................. 705/26 |
| 6,055,519 A | * | 4/2000 | Kennedy et al. ............. 705/80 |
| 6,076,076 A | * | 6/2000 | Gottfreid ..................... 705/26 |
| 6,141,653 A | * | 10/2000 | Conklin et al. ................ 705/1 |
| 6,295,513 B1 | * | 9/2001 | Thackston ..................... 703/1 |
| 6,384,923 B1 | * | 5/2002 | Lahey ...................... 358/1.13 |
| 6,397,197 B1 | * | 5/2002 | Gindlesperger ............... 705/37 |
| 6,535,294 B1 | * | 3/2003 | Arledge et al. ............. 358/1.15 |

FOREIGN PATENT DOCUMENTS

| | | | |
|---|---|---|---|
| EP | 0886206 A2 | * | 5/1998 |
| JP | 09034953 | | 2/1997 |
| JP | 10063725 A | * | 3/1998 |
| JP | 11110451 | | 4/1999 |
| WO | WO 96/10793 | | 4/1996 |
| WO | WO 96/16365 | | 5/1996 |
| WO | WO 97/07472 | | 2/1997 |
| WO | WO 97/28506 | | 8/1997 |
| WO | WO 97/29441 | | 8/1997 |
| WO | WO 97/31322 | | 8/1997 |

OTHER PUBLICATIONS

U.S. Appl. No. 09/270,007.*
U.S. Appl. No. 09/311,150.*
Towards Evolutionary and Adaptive Workflow Systems—Infrastructure Support Based on Higher-Order Object Nets and CORBA; Ingo ClaBen, Herbert Weber and Yanbo Han; XP-002135793; pp. 300-308.
"A Fine Mes"; State of the Art; Jim Esch; Petersborough, NH, US; No. 12; pp. 67, 68, 70, 74, 75.
"Simulation System for Real-Time Planning, Scheduling, and Control"; Glenn R. Drake and Jeffrey S. Smith; pp. 1083-1090.
PCT International Search Report; International Application No. PCT/US 99/24131 Dec. 4, 1998.
"A Knowledge Based, Integrated Process Planning and Scheduling System for Document Preparation"; Roger M. Kerr; XP-000892975; pp. 497-506.
"Heuristic Knowledge Representation of Production Scheduling: An Integrated Modeling Approach"; Sung Joo Park and Jong Woo Kim; XP-000893055; pp. 325-339 XP-002130869; 1 page.
"From Contemporary Workflow Process Automation to Adaptive and Dynamic Work Activity Coordination and Collaboration"; Amit Sheth; XP-002135795 pp. 24-27.

* cited by examiner

Job Request

Customer [70]    Delivery Date [74]
Address [72]    Title of job [76]

Job Description:                    ⟵ 78
    Duplicating ☐ B & W ☐ Color ☐ 1 - sided ☐ 2 - sided
    Bindery ☐ Stapling ☐ 3-hole drilling ☐ Covers
    Paper ☐ White ☐ Letterhead ☐ Color
    Art work [80]

Delivery:
    ⦿ Use customer address
    ◉ Ship to: [86]

82 ⟶

Pricing:
    # of copies [ ]
    Labor $ [ ]
84 ⟶    Materials $ [ ]
    Sub-total $ [ ]
    Tax $ [ ]
    Total $ [ ]

ITERATIVE CONSTRAINT COLLECTION SCHEME FOR PREPARATION OF CUSTOM MANUFACTURING CONTRACTS

FIELD OF THE INVENTION

The present invention relates to electronic commerce applications and, in particular, such applications as may be used for computer-based contracting among customers and vendors.

BACKGROUND

In the world of custom manufacturing, present-day buyers have limited control over the conditions under which they purchase goods and/or services. Some of the reasons for such limited control are the limited potential number of service providers/vendors who can understand and fulfill increasingly complex task descriptions and buyers' inability to communicate with a sufficient number of such individuals/organizations to always obtain the best price and terms for such jobs. Large organizations or governments which want to may have sufficient resources to formulate detailed written specifications setting forth their requirements (so-called "Requests for Proposal" or RFPs), however, smaller or individual buyers often cannot bear the added expense of trying to attract a wide number of vendors/service providers by paying to publish RFPs in newspapers or trade magazines.

The Internet, however, is becoming an equalizing force in commerce. To wit, many types of commerce systems, such as catalogs and auction houses, are being implemented on the Internet and such approaches are leveling the commerce playing field by giving consumers greater access to a wide array of vendors and service providers. For example, there have been some attempts to use the Internet to effectuate buyer-driven transactions, such as the "reverse auction" process described in U.S. Pat. No. 5,794,207. In brief, the '207 patent describes a bilateral buyer-driven protocol for use in purchasing commodity items such as airline tickets, hotel rooms, insurance contracts, and the like. These items are termed "commodities" herein because they exist independent of the buyer's needs. For example, available seats on an aircraft exist whether or not someone is willing to pay for them. Empty seats are not provided anew each time a buyer requests one.

Essentially, under the protocol espoused by the '207 patent a buyer specifies how much he or she is willing to pay for the commodity of interest and different vendors/service providers are allowed to accept or reject the proposal. Notably, this protocol offers no room for "negotiation" between the parties. That is, because commodity items are being bought and sold, there is no opportunity for vendors and customers to interact with one another to reach a mutually agreeable extended set of contract terms and conditions. Instead, under the protocol of the '207 patent the only true negotiating point is the price the buyer is willing to pay. Vendors are left with the task of trying to fit the buyer's set of criteria into one of their existing commodities and then either accepting or rejecting the price specified by the buyer. Some assistance may be provided by the provider hosting the reverse auction service in as much as the service provider can specify some contract terms. See U.S. Pat. No. 5,794,207 at col. 8, lines 61-63. However, it appears that these terms are being set by the service provider not because the buyer so desires, but rather in an effort to make the buyer's offer legally binding, apparently making it more attractive to sellers. Id. at col. 7, lines 36-38.

Although useful for the commodity purchase situation, the buyer-driven protocol described in the '207 patent fails to provide sufficient flexibility for use in the custom or on demand manufacturing environment. Custom orders, as the name implies, are requests for products or services that are unique to the buyer and/or the purchase situation. For example, print jobs (e.g., for books, manuals, stationary supplies, and the like) are typically unique to each customer. Although the same factory (e.g., print shop) and/or same equipment (e.g., printers, binding machines, etc.) may be used according to established procedures to satisfy each unique job request, the output of each request is generally different from that of other requests.

Because of the uniqueness involved in custom manufacturing requests, commodity pricing generally cannot be employed. Often, the terms of each customer's order(s) will vary, requiring different amounts of labor and materials to satisfy the order(s), and will thus impact the overall price. Further, delivery dates and/or schedules (where ongoing deliveries are required) may affect the price of a job request. Compounding this problem and leading to the difficulty of implementing a reverse auction protocol for such situations is the fact that prospective customers may not know how to accurately specify their job requests so as to allow a vendor to accurately price the requests. Thus, unlike the buyer-driven processes described in the '207 patent and existing RFP processes, customers may not be able to accurately formulate a detailed written specification setting forth the quantities and requirements of what they are looking to buy.

Accordingly, there is a need for a electronic commerce model capable of being utilized by even small consumers to communicate their custom manufacturing needs globally to potential vendors/service providers which addresses the deficiencies of the prior art.

SUMMARY OF THE INVENTION

In one embodiment of the present scheme a series of iterative customer submissions and vendor responses are used to collect sufficient information concerning a custom manufacturing project so as to produce a sufficiently constrained job request as to allow at least one of the vendors to submit a quote for the project. The submissions and responses are preferably made through Web forms and, in one example, the custom manufacturing project is a print job. The collection process is preferably computer assisted so as to incrementally add constraints to an initially under-constrained job request to produce the sufficiently constrained job request.

In a further embodiment, a computer-based service is configured to allow a customer and one or more vendors to interact with one another in defining a task description for a custom manufacturing project by permitting the customer to specify, in an initially under constrained fashion, the task description and further permitting the vendors and the customer to successively develop the task description to a fully constrained form (e.g., including payment and delivery terms) through an iterative process in which one or more constraints on the task description are added, removed and/or modified during each iteration. The customer is preferably permitted to vary information regarding the task description on a vendor-by-vendor basis.

Through use of the service, the customer and the vendors interact with one another through a series of notification messages transmitted via a Web server. The Web server may be configured to store vendor-specific instances of the task description, each accessible by the customer. Further, vendor-specific views of the initially underconstrained task description specified by the customer may be provided to each vendor while a customer-oriented view of multiple ones of the vendor-specific instances of the task description may be provided to the customer upon request.

In still another embodiment, a computer-based task description that includes a set of constraints arrived at through an iterative process in which a customer and one or more vendors successively define criteria for completing the task defined by the description, the criteria including payment and delivery terms sufficient to support a binding contractual obligation, is provided. This task may be a custom manufacturing job, such as a print job.

In still a further embodiment, a Web server is configured to allow a customer and one or more vendors to define one or more instances of a task description for a custom manufacturing project. In essence, the Web server permits the customer to specify, in an initially under constrained fashion, the task description and then permits the vendors and the customer to successively develop the task description to a fully constrained form through an iterative process. In this process, one or more constraints on the task description are added, removed and/or modified during each iteration. The customer and the vendors may be permitted to add, remove and/or modify the task description through the use of Web forms and the Web server may include a notification engine configured to provide notification messages to the customer and the vendors, as appropriate, upon an indication that at least one of the instances of the task description has been modified in some way.

The Web server may also be configured with one or more vendor-specific interfaces through which vendor-specific ones of the instances of the task description may be provided to the vendors. Preferably, a customer interface through which a common customer view of one or more of the vendor-specific instances of the task description is also provided. The customer interface may then be configured to allow a comparison of the one or more vendor-specific instances of the task description.

Other features and advantages of the present scheme will be apparent from the detailed description below and its accompanying drawings.

BRIEF DESCRIPTION OF THE DRAWINGS

The present invention is illustrated by way of example, and not limitation, in the figures of the accompanying drawings in which like reference numerals refer to similar elements and in which:

FIG. 4 illustrates an example of a Web form that may be used for a print job request as presented through a customer interface configured in accordance with an embodiment of the present invention.

DETAILED DESCRIPTION

Figure 1:
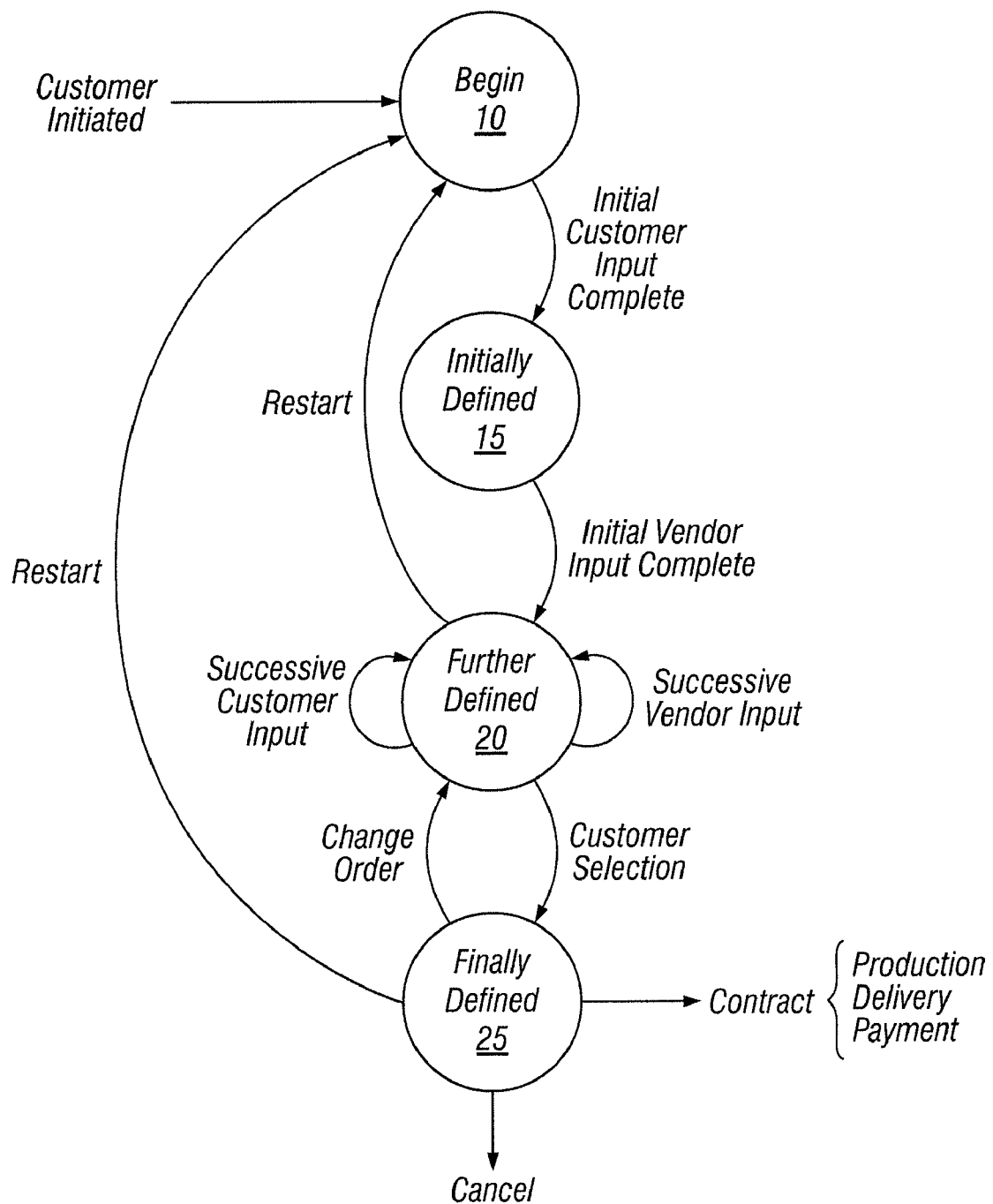
FIG. 1 is a state diagram illustrating various states of a job request as it is processed according to an embodiment of the present invention.

A scheme for preparing custom manufacturing contracts through an iterative process by which under-constrained job requests are tailored into more or fully constrained requests through a collaborative process between vendors and customers is disclosed herein. An example of this scheme suitable for use in the preparation of custom print job requests/contracts is described in detail so as to provide a complete description of the methods and apparatus of the present invention. More generally, the present scheme provides a marketplace for the solicitation and fulfillment of purchase options, rather than merely a request for an existing product. Therefore, although discussed with reference to such embodiments, upon review of this specification, those of ordinary skill in the art will recognize that the present scheme may find application in a variety of systems and, accordingly, the illustrated embodiments should be regarded as exemplary only and should not be deemed to be limiting in scope.

Furthermore, the examples presented herein describe Internet-based apparatus and methods, which are but one embodiment of the present invention. The general concepts and reach of the present invention are much broader and may extend to any computer-based or network-based system. Also, examples of the messages that may be passed to and from vendors/service providers and customers as well as the various graphical formats/layouts in which custom manufacturing information may be represented and/or collected are given in an attempt to further describe the types of dialogs that users may have with the present system and with one another. These messages and layouts are not meant to be all-inclusive examples and should not be regarded as such. Moreover, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

The present scheme adopts a job request-centric model to assist in specifying job requests that involve multiple constraints. In this model, job requests are treated as objects and are allowed to exist within a database before they are tied to specific contract terms. The job requests are allowed to have certain properties, such as the customer making the request, the job title, completion dates, initial work specifications, etc., and the model then allows for the collection of constraints around the job requests to assist in the formalizing and completion thereof. The constraints may be expressed as additional work orders, or other job item requirements needed for a vendor or service provider to accurately price the job request in order to ultimate bid on it and/or render a quote for completion. In other words, the job request may be progressively constrained by the interaction of the customer and prospective vendors/service providers with the job request object, such participation thus defining the ultimate job request for which quotes will be solicited/provided.

In one embodiment, the present model is implemented as a computer-based service that may be accessed through the Internet, for example using a Web browser. The service provides an interface that allows a customer to post information regarding his or her job request, and further allows one or more vendors/service providers to access and/or update such information. This update process is one means by which the collection of constraints on the job request may be accomplished. The vendors are preferably provided with information regarding the job request through an interface tailored to their specific needs. Although in some cases this may be the same interface as is used by the customer, in other cases it is a vendor-specific interface that is customized to present job request-related information in a format suitable to the vendor's requirements.

Through such interfaces, the vendors/service providers are allowed to indicate their own availabilities for the job request and further are allowed to add additional constraints to the request that make it more complete. This information may be consolidated with that provided by the customer to produce a more fully constrained job request. By way of example, where the customer is seeking quotes for a print job, vendors may be able to specify different pricing structures for different types of bindings, covers, delivery schedules, and the like. Afterwards, the customer may review the updated job request as modified by the various vendors in order to select a vendor or to better define his or her own requirements so as to continue the above process. Ultimately, a vendor will be chosen and a final contract for the custom manufacturing project agreed upon. Performance, delivery and payment may follow.

As indicated above, one embodiment of the present scheme provides an Internet-based implementation. Accordingly, some introduction to Internet-related technology is helpful in understanding the present scheme. The Internet is a vast and expanding network of networks of computers and other devices linked together by various telecommunications media, enabling the various computers and other devices to exchange and share data. The Internet provides information about a myriad of corporations and products, as well as educational, research and entertainment information and services. An estimated 30 million people worldwide use the Internet with 100 million predicted to be on the "net" in a matter of years.

A computer or resource that is attached to the Internet is often referred to as a "host." Examples of such resources include conventional computer systems that are made up of one or more processors, associated memory (typically volatile and non-volatile) and other storage devices and peripherals that allow for connection to the Internet or other networks (e.g., modems, network interfaces and the like). The precise hardware configuration of the hosting resource is generally not critical to the present scheme, nor are the precise algorithms used to implement the services and methods described herein. Instead, the focus is on the nature of the services provided by and through the hosting resource.

In most cases, the hosting resource may be embodied as hardware and/or software components of a server or other computer system that includes an interface module, which allows for some dialog with users, and that may process information through the submission of Web forms completed by the user. Generally, such a server will be accessed through the Internet's graphical user interface, the World Wide Web (e.g., via Web browsers), in the conventional fashion. Operating in conjunction with the interface module may be a communication interface that supports the distribution of electronic mail (e-mail) messages to or from other Web sites or users (i.e., both vendors and customers in the present model).

In order to facilitate communications between hosts, each host has a numerical Internet protocol (IP) address. The IP address is made up of four groups of numbers separated by decimals. For example, the IP address of a hypothetical host computer might be 123.212.78.91. Each host also has a unique "fully qualified domain name." In the case of the hypothetical host 123.212.78.91, the "fully qualified domain name" might be "computer.domain.com".

In its most generic form, a fully qualified domain name consists of three elements. Taking "computer.host.com" as an example, the three elements are the hostname ("computer"), a domain name ("domain") and a top level domain ("com"). A given host looks up the IP addresses of other hosts on the Internet through a system known as domain name service.

As previously indicated, in order to access the Internet most users rely on computer programs known as "Web browsers." Commercially available Web browsers include such well-known programs as Netscape's Navigator™ and Communicator™ and Microsoft's Internet Explorer™. If an Internet user desires to establish a connection with a Web page hosted at computer.domain.com, the Internet user might enter into a Web browser program the uniform resource locator (URL) "http://www.domain.com". The first element of the URL is a transfer protocol (most commonly, "http" standing for hypertext transfer protocol, but others include "mailto" for electronic mail, "ftp" for file transfer protocol, and "nntp" for network news transfer protocol). The remaining elements of this URL (in this case, "www" standing for World Wide Web and "domain.com") are an alias for the fully qualified domain name of the host.

Once a URL is entered into the browser, the corresponding IP address is looked up in a process facilitated by a top-level server. In other words, all queries for addresses are routed to certain computers, the so-called top-level servers. The top-level server matches the domain name to an IP address of a domain name server capable of directing the inquiry to the computer hosting the Web page. Thus, domain name service ultimately matches an alphanumeric name such as www.domain.com with its numeric IP address 123.212.78.91.

When a host receives an inquiry from the Internet, it returns the data in the file pointed to by the request to the computer making the inquiry. Such data may make up a Web page, which may include any message, name, word, sound or picture, or combination of such elements. A user can move between Web pages through the use of hyperlinks, which are links from one site on the Internet to a second site on the Internet. Hyperlinks are also used to initiate the transfer of files or other information from the hosting resource to the user's computer in a process commonly known as downloading.

Often when interacting with Web-based documents, a user will be presented with a Web form. In general, a form is a collection of form fields displayed as a Web page by a browser in response to hypertext mark-up language (HTML) tags and other information received from a Web server. An associated form handler resides at the server to collect and process the information submitted by a user via the form. By using such forms, an information collection process performed by a host is made interactive with the users thereof. That is, users can add text to text boxes, select from drop down menus and/or select check boxes and/or radio buttons, etc. Typically, the user submits the form by clicking on a submit button or other appropriately labeled element of the form and, upon such submission, the contents of the form are passed to the form handler. Depending upon the type of information being submitted and the type of form handler being used, the information submitted by a user may be appended to a file maintained by the host, for example a file associated with a temporary account assigned to the user or a larger database. In this way information may be collected, processed and displayed to those who access it.

As indicated, common Web form input devices are text boxes, check boxes and radio buttons. A text box is a standard form field into which a user can type text. When a form containing a text box is submitted in a Web browser, the name and contents of the text box are provided to the form handler running on the server. A check box field is typically arranged in a grid or matrix fashion with one or more cells of the matrix including a check box. Check box fields present a user with choices that can be made by clicking (e.g., selecting or deselecting as appropriate) a check box. Such fields are created and rendered using programming techniques common in the art and any number (including all or none) of individual check boxes may be selected or not. When a user submits a form containing a check box field, the name of each check box along with its value is provided to the form handler at the host. Radio button fields present a user with a choice that can be made by selecting a button. Radio buttons are displayed in a set, only one of which may be selected at a time. When radio button fields are created, they are assigned a group name, and each button in the group is assigned a value and an initial state (selected or not selected). When the user selects one of the buttons in the field, all other buttons in the field take on a value of not selected. Then, when the user submits the form, the group name and value of the buttons is provided to the corresponding form handler at the server for processing.

Form handling is a common example of server-side programming. Server-side scripts or programs are algorithms that are run on Web servers in response to requests from a client (e.g., a Web browser). These scripts may produce HTML as output, which output is provided to the requesting client as if the client had requested an ordinary Web page. The details of how server-side scripting works vary widely with the technique used (and there are many), however, some constants are found across these different techniques. In general, the Web server receives a request just like any other, but notes that the requested URL does not map to a file, but instead to a scripting area. The server then starts the script, providing it with the information contained in the request headers and URL. The script then runs and produces as its output the HTML to be returned to the client, which the server does.

One means by which information may be submitted through Web forms is via a CGI (Common Gateway Interface) program. CGI programs may be executable programs or interpreted programs (i.e., those written in an interpreted rather than a compiled programming language). CGI itself operates completely independent of the underlying programming language, operating system and/or Web server. Currently it is the most common server-side programming technique and provides a mechanism for servers to know which URLs map to scripts and not just to ordinary HTML files (i.e., ordinary Web pages).

An alternative to using CGI is programming to the server applications program interface (API) itself. That is, writing a program that essentially becomes a part of the server process and uses an API exposed by the server. The problem with this technique is that each API is server-dependent. However, using API programming may allow for faster response times to user inquiries, in as much as the needed program to provide the response will already be loaded into memory together with whatever data it needs.

With these concepts in mind, an embodiment of the present model can be further explored. As discussed briefly above, the present model allows for various states during the creation and existence of a custom manufacturing job request, as shown in FIG. 1. For example, a new job request (to be represented as a database object) may be created by a customer seeking estimates/quotes for completing the request. Initially (state 10) the customer will specify a set of constraints that define the job request. Usually, however, this description will not be sufficient to establish a complete job request, for example because the customer simply does not know how to complete such a request. Nevertheless, with whatever information the customer is able to provide, the job request will exist in a initially defined or constrained state 15.

While in the initially defined state 15, various vendors and/or service providers (depending on the nature of the job request) may have access to the job request description provided by the customer. Such access may be granted to targeted vendors, etc. that were specifically notified of the request, or to any vendors who view the request as part of a general job request posting. For each vendor/service provider, unique descriptions of the job request may be available through interfaces that customize the job request in a format familiar to that vendor/service provider. For example, specific vendors may specify various information filters that allow ready access to items such as completion date required, because such information may dictate whether or not the vendor/service provider should even participate further in defining the job request. If the required completion data cannot be satisfied by the vendor, there seems little point in bidding the project. On the other hand, some vendors may immediately submit responses asking for flexibility in the completion date as a means by which to gauge whether to further examine the job request.

For those vendors/service providers that provide input to further constrain the job request object (e.g., by adding start times and/or dates, paper selection choices, various pricing/delivery schemes, etc.) each may submit a further defined version of the job request (state 20) for review by the customer. That is, the individual vendor responses may generate multiple instances of the request objects in the database, each instance having various defining characteristics gathered through the job request definition cycle.

The customer may be notified of various vendor submissions and may then take the opportunity to review them. In some cases, an interface that allows for comparison of the various vendor-specific job request objects that have been established may be used, to allow the customer to comparison shop between the various vendor/service provider options. Also, the customer may have the opportunity to further define the job request by answering vendor queries, modifying vendor and/or customer defined constraints, adding additional constraints (e.g., by selecting from among vendor-specified options), and so on. These further constrained job requests are again provided to the vendors/service providers to allow for further revision/updating of the job requests. Note that during this constraint collection process, the customer may restart the process and invite other or even different vendors to participate.

Ultimately, an customer may choose one of the available job request definitions (although in some cases only a single job request or even no job requests may exist), causing the job request to become fully defined (state 25). In this state, the job request should be sufficiently defined (e.g., through the collection of constraints in the iterative procedure discussed above) so as to allow the vendor/service provider with which it is associated to render a final quote. The customer is free to accept the quote (leading to the generation of a final contract that can be performed, the work product delivered and payment therefore rendered) or to reject it and start the process anew. Alternatively, the job request may be cancelled if the customer or the vendor so chooses. Any final contract will include the announced set of constraints, unless changes thereto are ordered or the job request itself is cancelled.

The present model offers the increased flexibility in defining contract terms over the reverse auction scheme described in the '207 patent. For example, under the present model, vendors/service providers are allowed the opportunity to customize their responses to take into account the unique nature of the custom manufacturing job request specified by the user. Further, the present model allows customers to review and assess competitive bids, without having to accept a first response from a vendor willing to do the job. This assessment can be conducted without having to understand all of the requirements necessary to fully specify a job, because the iterative constraint collection mechanism allows vendors to guide and assist the user in making selections. This vendor-customer negotiation process more closely emulates physical world bargaining and so should provide each participant in the process with a familiar environment. If vendor and customer specific interfaces are used in the fashion described herein, each participant is further presented with job request information in a format that is meaningful and useful.

Figure 2:
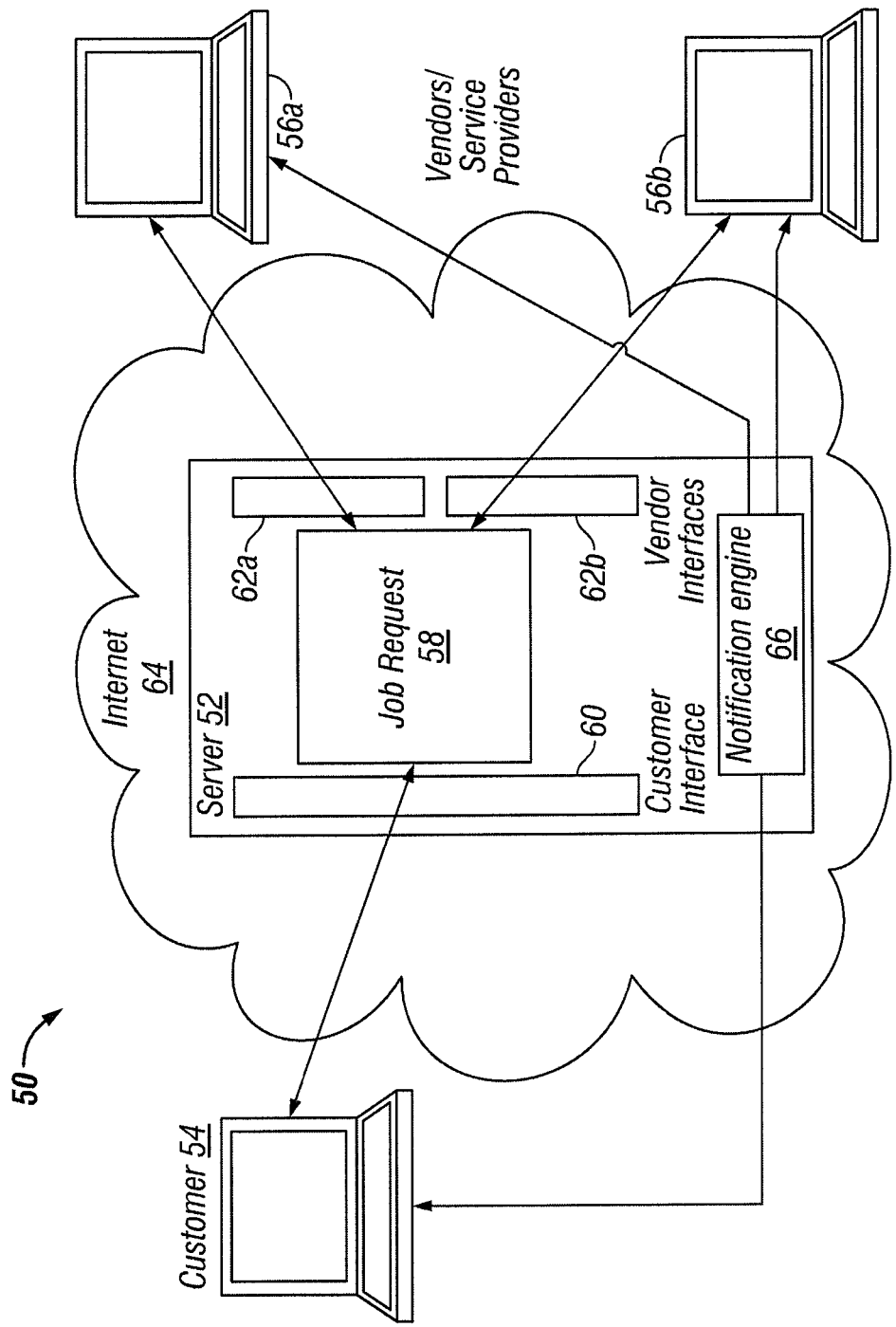
FIG. 2 illustrates a computer-assisted contracting service configured in accordance with an embodiment of the present invention.

Referring now to FIG. 2, a computer-based system 50 that has been configured in accordance with the present scheme is shown. Computer-based system 50 is configured so as to allow a Web server 52 to act as a coordination point to bring together customers 54 and vendors/service providers 56a and 56b. Examples of such users may be customers seeking to contract out a print job and print shop owners/operators seeking to bid on the job. In general, the customer 54 will be able to specify a job request 58 (which may be maintained as a object in a database stored by or associated with server 52) in a fashion to which he/she is accustomed and the vendors will be able to view and interact with the job request as described above.

One might expect that some or all of vendors 56a, 56b are accustomed to defining job requests in different fashions, perhaps customized to their own environments. Thus, even two print shops may have different means and methods for specifying the same job request. Such personalized job request descriptions are often of little help to customers when the customer is seeking to compare different bids/estimates for work, as it can often be difficult to reconcile such items among the different job request descriptions. Therefore, the present computer-based system provides a customer interface 60, through which customers 54 can view the job request (i.e., in its several instances after different vendors have modified it). The customer interface 60 can be personalized to the customer 54, thus allowing the customer to control the manner in which various vendor bids/estimates are presented for review.

Of course, if different vendors were forced to try and accommodate many different customers, each with their own personalized job requests, few if any vendors would choose to utilize system 50. Accordingly, different vendor interfaces, 62a and 62b, are provided. An associated vendor interface allow a vendor/service provider to view a job request 58 in a manner meaningful to that vendor. Thus, the vendor interfaces 62a and 62b can be customized by the vendors at a time when the vendor registers with the computer-based contracting service operating server 52, or on-the-fly as a vendor seeks to discover information about a new customer job request. Because the coordination function provided by Web server 52 allows each of the users (customers and vendors) to access information surrounding job request 58 in a manner meaningful to that user, greater customer and vendor participation is likely. Of course, the use of customer interfaces 60 and vendor interfaces 62 is optional, and some embodiments of the present scheme will use only one or the other or even neither.

Once customer 54 has created the job request 58, the vendors/service providers, 56a and 56b, can access the job request 58 to provide their own constraints/information. Thus, Web server 52 acts as an aggregation point for each user's job request information and allows customers to quickly decide upon a vendor for the job request. Remember that, although not shown in detail in the figure, each vendor will spawn an associated, personalized instance of the original job request 58. That is, vendor 56a will, after modifying and constraining the original job request 58, create a more fully constrained instance of that job request, which is stored at server 52. Such a vendor-personalized instance of the job request can be stored in memory at server 52 and associated in the database with the original job request 58. That way, when a customer 54 accesses the job request 58, he or she may be provided with information about the existence of the vendor-personalized instance(s) of the job request, each or all of which can be viewed individually or collectively (e.g., through customer interface 60) for comparison and additional mark-up (i.e., addition of further constraints, etc.).

The manner in which these information collection and aggregation activities are carried out will be discussed in detail below. For now, it is sufficient to note that customer 54 may create job request 58 by accessing Web server 52 using a personal computer (or other Internet-capable device). Preferably, the customer 54 has a computer configured with a Web browser application that allows access to Web server 52 across the Internet 64. Using the Web browser, the customer 54 is allowed to register with the Web server 52 and create the job request 58, for example by submitting one or more Web forms that describe the job request (e.g., a print job, etc.), the vendors to be solicited for bids (e.g., by their respective e-mail addresses or company names which can be cross-referenced to e-mail addresses using an address book provided by server 52, etc.) and (possibly) further information regarding the job request. A deadline for a response by the vendor(s) may also be specified, where appropriate. Often, as indicated above, the customer 54 will under constrain the job description because he or she is simply unaware of all of the items needed by the vendors to make a full evaluation of the job, or because the customer is unconcerned with such details.

Once the job request has been initially defined in this fashion, Web server 52 will transmit individual solicitations to the vendors noted by customer 54, for example in the form of e-mail messages, telephone calls, pager or facsimile notifications or other forms of active notifications using a notification engine 66. These notification messages may indicate the nature of the job request and invite a response by the vendors through a visit to Web server 52. In other cases, passive forms of notification may be used, such as to-do lists posted at a Web site maintained by the vendor or the service provider operating Web server 52.

When a vendor responds to the solicitation and visits the Web server 52 (e.g., using an associated personal computer with a Web browser), he or she may be presented with a unique view of the job request 58 through a vendor-customized interface and is allowed to modify the job request by adding additional constraints thereto and/or modifying customer-defined constraints. In this way, each vendor/service provider 56a, 56b may indicate his or her own criteria for the job request so that the customer 54 can determine a best available vendor for completing the job.

As vendors reply and create new instances of the job request, the customer 54 is informed of their responses through notification messages transmitted by server 52. The customer may then view the individual vendor replies, comparing them against one another, and/or adding/removing/modifying constraints, perhaps in reply to vendor queries for preferences, and/or on a vendor-by-vendor basis, etc. The vendors may be notified of such changes (again by appropriate active or passive notification messages) and allowed an opportunity to revisit their vendor-created instances of the job request to further define them and/or to submit estimates for the request. Ultimately, a final version of the request (i.e., one for each vendor or simply one final version thereof) will be generated and the customer 54 will accept a vendor estimate. Sometimes, additional details may need to be worked out between that vendor and the customer before a final contract and quote for the request is put in place.

Figure 3:
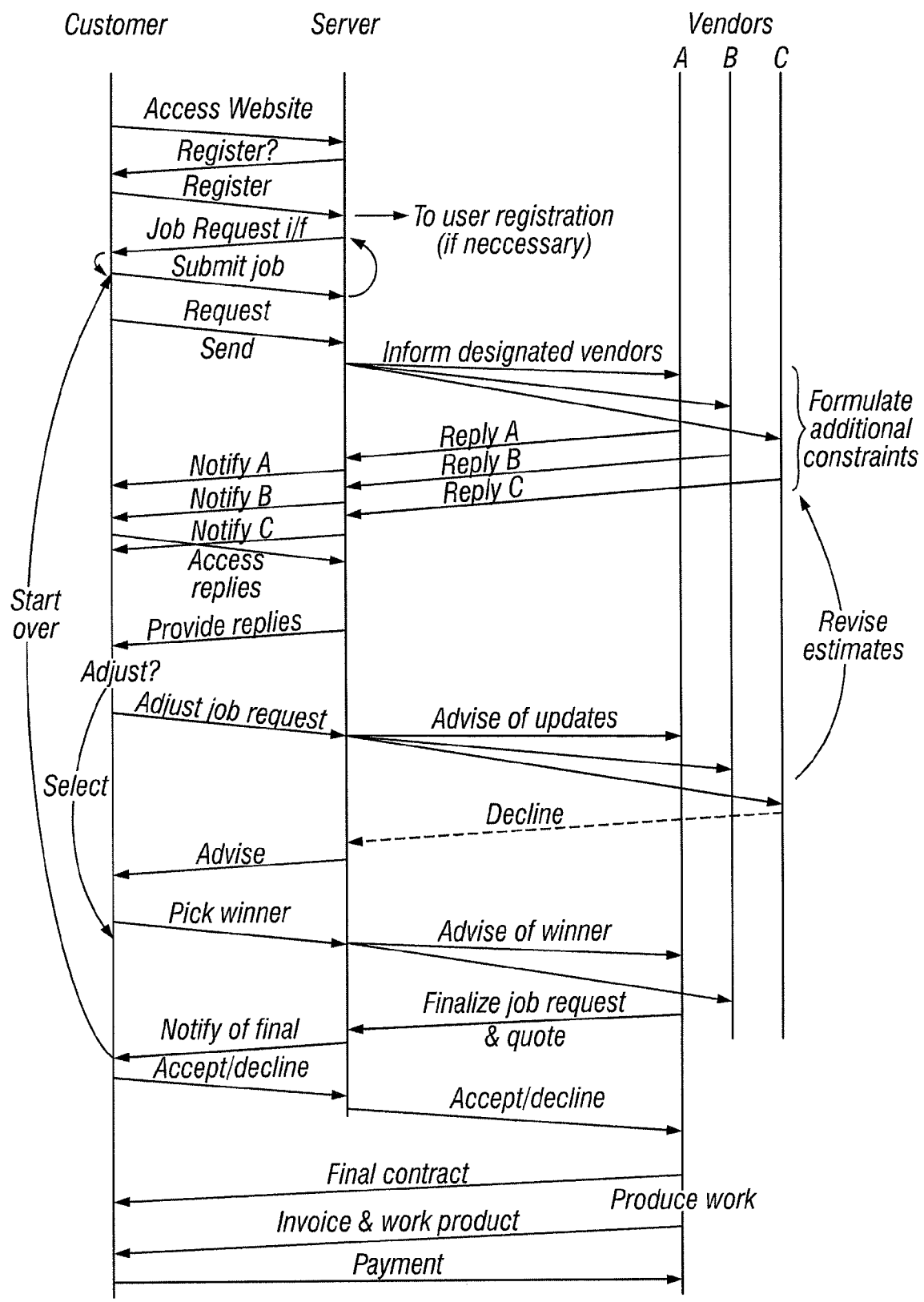
FIG. 3 illustrates an example of a dialog that may occur between a customer and one or more vendors utilizing the services of a hosting computer system configured in accordance with an embodiment of the present invention.

FIG. 3 illustrates some of the details concerning the contracting operations described above. In the example presented in this drawing, dialogs between a customer, the hosting server and several vendors are illustrated along a time line, where time runs from the top of the page to the bottom. The customer is seeking estimates/quotes from the vendors for a job request to be specified according to the iterative constraint collection process discussed above. Thus, using a personal computer (or another device with Internet access capability), the customer accesses the hosting server, for example by visiting a Web site at which the contracting service can be found. Preferably, such access is made through a Web browser in the customary manner for accessing an Internet resource. That is, using a Web browser running on personal computer, the customer accesses the hosting server by identifying the universal resource locator (URL) or Web address associated therewith. In this example, the hosting server will be identified by the URL www.servicename.com/server, where "servicename" identifies the computer-assisted contracting service and "server" identifies a particular file or directory for a script running on the server. In one embodiment, the hosting server is a hypertext transfer protocol (HTTP)-capable site, so the Web browser may be instructed to access the server using the HTTP.

In order to use the computer-assisted contracting service, the customer may first have to register with the site, or otherwise identify him/herself to the hosting server. Accordingly, a registration dialog between the customer and the hosting server may be held, during which the customer may submit identifying information such as a user name and a password. If the user is not already registered, he or she may be asked to do so before proceeding. Such registration schemes are well known in the art and need not be further described herein.

Once registered, or after successful identification, the customer may proceed to define the job request. As indicated, this may be done through a customer-friendly interface (i/f) provided by the hosting server. The hosting server is configured to treat a job request as an object having various properties—at least partly defined by the customer. For example, where the customer is specifying a print job request, the properties of the job request may include a text message describing the job, a list of the vendors to whom the job request is to be submitted, a due date for the job and a deadline for response. Other job request types will have other properties associated therewith. Regardless of the particular properties, however, the hosting server treats each job request as a unique object. By doing so, the server is able to define accounts for each of the vendors identified by the customer, each account being uniquely associated with an instance of the defined job request.

Preferably, each vendor is identified by his or her e-mail address when the customer creates the job request. This e-mail identification will allow the server to e-mail individual messages to the vendors. In some cases, for example where a customer has established a personal address book maintained by the computer-assisted contracting service, the e-mail addresses of the vendors may be recalled from a list or other source. In other cases, a customer may be able to use a general vendor address book maintained by the computer-assisted contracting service.

Having defined the accounts for the job request, and upon receiving a customer instruction to transmit the job request to the identified vendors, the server now provides notification messages to each vendor having an account. Thus, in this example, e-mail messages are transmitted to three different vendors. Of course, this assumes that the vendors have e-mail clients or other applications available on personal computers to receive and render the e-mail messages. In some cases, vendors may use Internet e-mail accounts, in which case the participants are able to retrieve e-mail messages using a Web browser application. Either of these e-mail retrieval methods are suitable for use with the schemes discussed herein. Where vendors do not have e-mail accounts, other message delivery mechanisms (e.g., mail, telephone, facsimile) may be used.

The notification messages are created using computer programming techniques common in the art and may include the text of the job request along with other information defined by the customer in a message field. Also included in the notification messages is an indication that each vendor may access information associated with job request by visiting a specified Web address associated with the server and the individual vendor's unique account. This allows each vendor to access his or her associated instance of the job request and to further define that job request through the addition/modification/removal of constraints associated therewith. Using unique vendor accounts also prevents vendors from viewing one another's bids, so as to provide the customer with some control over the contracting process. In other cases, it may be desirable to allow the vendors to review (but not change) one another's bids so as to foster competition.

When one of the vendors (e.g., vendor A) does access the server by responding to the e-mail solicitation, the server may verify the identity of the vendor and display the job request through a graphical interface meaningful to that vendor. That is, the server may transmit hypertext markup language (HTML) instructions via HTTP that cause the Web browser being used by the vendor to render the desired image. This vendor interface may include a variety of items, but preferably includes the text of the job request along with other information prepared by customer. Also, the interface may include specific vendor-defined fields that can be filled in to further constrain the job request in a fashion that allows the vendor to provide an accurate estimate for the job or which will prompt the customer for further information about the job.

As each vendor/service provider responds to the job request, the customer is so notified (e.g., via e-mail). The information provided by the vendors will be coordinated with information received from the customer and made ready for display to the customer when he or she returns to the hosting server (note, this may be done in a preprocessing stage or on-the-fly when the customer actually requests the information). Then, at any time, the customer may return to the hosting server to check on the status of the job request. In some cases, once all designated vendors have responded (and/or indicated they are not interested in providing a bid), the server may send a notification message to the customer, specifying that such actions have been completed.

Thus, the server acts as a central point for collecting information that assists a customer in contracting out a job. As indicated above, the collaborative coordination or constraint collection protocol implemented by the server may, in some cases, make use of specialized tools that are presented as customer-specific and/or vendor-specific interfaces. Some of these tools may be forms (i.e., Web forms). FIG. 4 illustrates an example of a Web form that may be used by a customer to specify a print job request.

As shown, various text boxes 70, 72, 74, 76, may be provided for the customer to enter identifying information and job description requirements. Other job description characteristics such as the type of binding required, whether any duplicating services are needed, the type of paper to be used, art work descriptions, etc. may be specified (or not) using check box fields 78 and/or text boxes 80 (or even other form attributes. Note, some users will not be able to specify such requirements, leaving it for the vendor/service provider to add such constraints on the job request.

Delivery and pricing fields 82 and 84 may be included. For example, a delivery field 82 may make use of radio buttons to indicate whether the customer address should be used as the shipping address or not. A text box 86 can be provided for alternate shipping addresses. The pricing field 84 will often be left blank by the customer (at least initially), and will be filled in using response information received from the vendors.

Returning now to FIG. 3, further steps in the computer-assisted contracting process are described. In response to the e-mail notification that some or all of the vendors have submitted responses, the participant can again access the job request. In this access, the customer may examine the individual vendor-instances of the job request and/or a combined view thereof that allows for ready comparison. The customer then has the opportunity to further constrain (define) the job request and resubmit it for vendor review. This process may be successively repeated a number of times, with additional or revised constraints being collected and reviewed. At some point, some vendors may decline to participate further, for example because the vendor cannot meet a particular constraint set by the customer.

Ultimately, the customer will be able to select a "winner", that is a particular vendor to complete the job request. This selection can be made through the hosting server, with subsequent notification to the winning vendor. This will allow the winning vendor to finalize his or her quote and submit it as a final contract for customer approval/execution. Finalizing the payment terms, billing, delivery schedule, etc. may be an important part of the process because it leads to the creation of an enforceable contract upon which both parties can rely. The actual work product, invoicing and payment may follow, and these processes will usually be conducted directly between the contracting parties.

Thus an iterative constraint collection scheme for preparation of custom manufacturing contracts has been described. Although the foregoing description and accompanying figures discuss and illustrate specific embodiments, it should be appreciated that the present invention is to be measured only in terms of the claims that follow.

What is claimed is:

1. A computer-based contracting method comprising:
   receiving a user-supplied set of constraints regarding a print job project;
   storing the set of constraints in a database as an object;
   creating a plurality of instances of the object, each instance uniquely associated with a corresponding vendor;
   communicating each instance of the object to its corresponding associated vendor;
   receiving communications from the user and the vendors to iteratively modify the instances of the object, the modifications further constraining the print job project;
   selectively displaying to the user the modified instances of the object individually or collectively; and
   receiving a selection from the user of one of the vendors to complete the print job project.

2. The method of claim 1, wherein the set comprises a text description of the print job project.

3. The method of claim 1, wherein the set comprises a list of vendors to whom the instances of the object should be communicated.

4. The method of claim 1, wherein the set comprises a due date for the print job project.

5. The method of claim 1, wherein the modifications comprise vendor-specified options for completing the print job project.

6. The method of claim 5, wherein the vendor-specified options comprise start times or dates.

7. The method of claim 5, wherein the vendor-specified options comprise media options.

8. The method of claim 5, wherein the vendor-specified options comprise pricing options.

9. A system for facilitating the formation of a contract for completing a print job project, the system comprising:
   a user interface adapted to receive a user-supplied set of constraints regarding the print job project;
   a database comprising a plurality of objects, each object comprising the set of user-supplied constraints, each object uniquely associated with a corresponding vendor;
   a plurality of vendor interfaces, each vendor interface uniquely associated with a corresponding vendor and adapted to communicate each associated object to its corresponding vendor; and
   a web server adapted to (a) transmit communications between the user and the vendors to iteratively modify the objects, the modifications further constraining the print job project, (b) selectively display to the user the modified instances of the objects individually or collectively; and (c) receive a selection from the user of one of the vendors to complete the print job project.

10. The system of claim 9, wherein the set comprises a text description of the print job project.

11. The system of claim 9, wherein the set comprises a list of vendors to whom the objects should be communicated.

12. The system of claim 9, wherein the set comprises a due date for the print job project.

13. The system of claim 9, wherein the modifications comprise vendor-specified options for completing the print job project.

14. The system of claim 13, wherein the vendor-specified options comprise start times or dates.

15. The system of claim 13, wherein the vendor-specified options comprise media options.

16. The system of claim 13, wherein the vendor-specified options comprise pricing options.

* * * * *